Figures 1, 2:
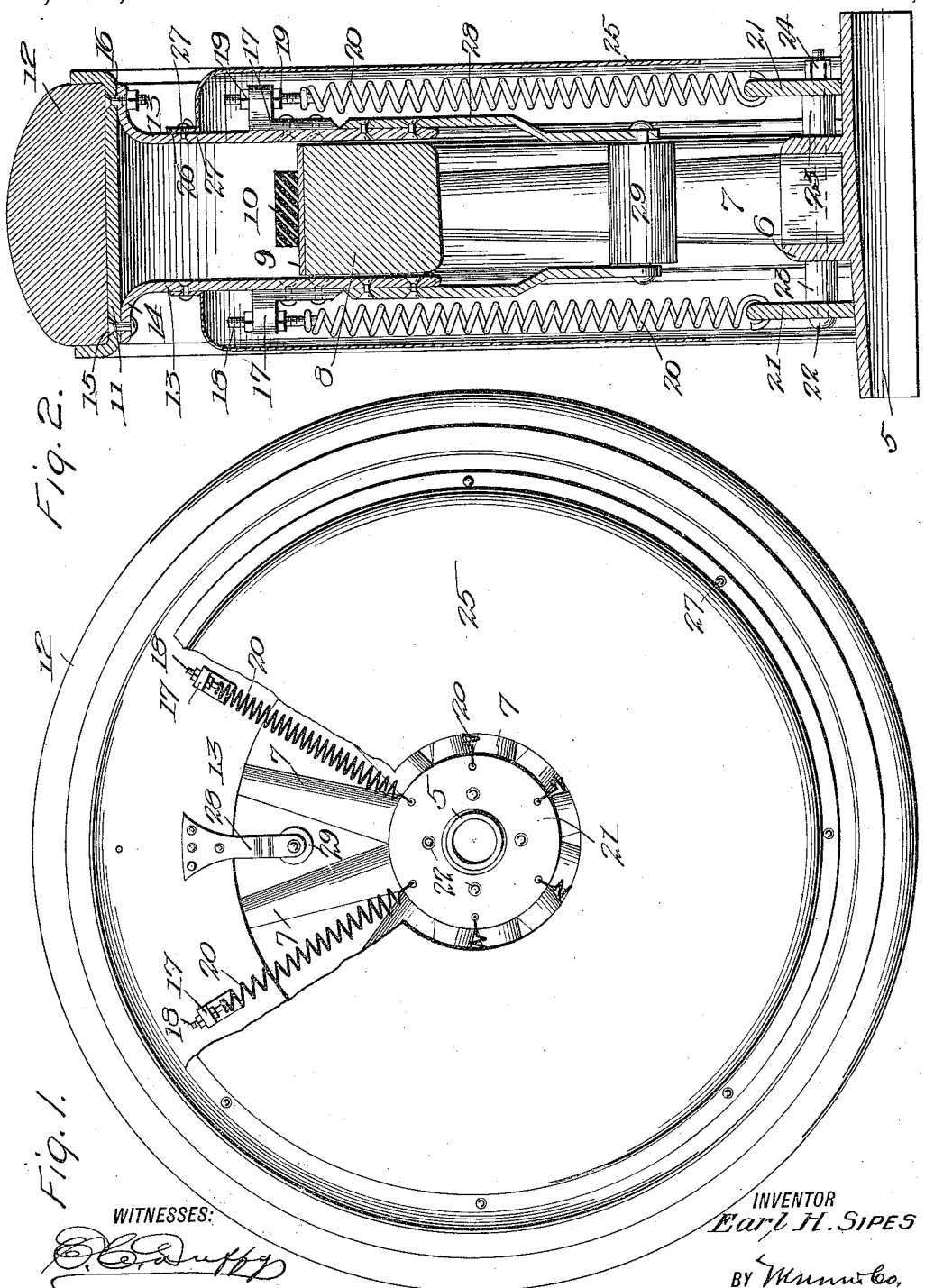

E. H. SIPES.
VEHICLE WHEEL.
APPLICATION FILED APR. 26, 1915.

1,160,004.

Patented Nov. 9, 1915.

WITNESSES:

INVENTOR
Earl H. Sipes

BY
ATTORNEYS

UNITED STATES PATENT OFFICE.

EARL H. SIPES, OF TRIPP, SOUTH DAKOTA.

VEHICLE-WHEEL.

1,160,004.			Specification of Letters Patent.			Patented Nov. 9, 1915.

Application filed April 26, 1915. Serial No. 24,047.

*To all whom it may concern:*

Be it known that I, EARL H. SIPES, a citizen of the United States, and a resident of Tripp, in the county of Hutchinson and State of South Dakota, have invented an Improvement in Vehicle-Wheels, of which the following is a specification.

This invention relates to vehicle wheels, and more particularly to that type commonly known as spring wheels and adapted for use on automobiles and other vehicles.

Heretofore, it has been aimed, in the construction of spring wheels, to relieve the vehicle upon which the wheel is mounted from all jars and concussions incident to travel on rough surfaces. In attempting to attain this result structures have been designed which consist generally of inner and outer rims, the former being secured to the hub of the wheel and the latter being connected to said hub by means of springs. In constructions of this character, when the clutch of an automobile is suddenly thrown on, as frequently occurs, there is provided no means for absorbing the shock incident to the sudden starting forward of the vehicle, which not only causes inconvenience to the passengers but also results in considerable strain upon the springs of the wheels and their connections.

It is an object of this invention to overcome the above objection by so constructing the wheel as to provide an outer rim element having a frictional engagement with the inner hub element so that sudden starting of the latter will cause a slight relative movement therebetween and impart a more gradual rotation to said outer rim element, means being provided for limiting said relative movement whereby the springs and connections therefor will not be subjected to undue strain.

A further object of the invention is the provision of a wheel of this character which is comparatively simple in construction, light, durable and one which may be manufactured at a minimum cost.

The inventive idea involved is capable of receiving a variety of mechanical expressions, one of which, for the purpose of illustrating the invention, is shown in the accompanying drawings; but it is to be expressly understood that the particular structure shown in said drawing is used merely for the purpose of facilitating the description of the invention as a whole and not for the purpose of defining the limits thereof, reference being had to the appended claim for this purpose.

In the drawing: Figure 1 is a side elevation of a vehicle wheel constructed in accordance with the invention, the housing being broken away. Fig. 2 is an enlarged fragmentary transverse section of the wheel.

Referring more particularly to the accompanying drawing in which like reference characters indicate similar parts, the numeral 5 indicates the hub of the wheel, the same being provided with a plurality of bosses 6 thereon for the reception of the spokes 7 of the inner rim 8, the latter being provided with a metallic band 9 to which is secured a cushion 10 preferably made of rubber.

The outer portion of the wheel comprises the outer rim 11 arranged concentrically to the inner rim 8 and to which is secured in any convenient manner a solid rubber tread tire 12. Oppositely disposed annular plates 13 are provided with the flanges 14 for securing said plates to the inner periphery of the rim 11 by means of suitable rivets 15 and bolts 16. The bolts 16 are used on one side of the wheel in order that the plates 13 on the adjacent side and the parts connected thereto may be removed so that access to the interior rim and other parts may be readily had, in order to make any necessary repairs. The space between the plates 13 is just sufficient to receive therebetween the inner rim 8 so that there will be a certain degree of friction between the inner faces of said plates and said rim for a purpose which will later appear. At regular intervals around the plates 13 and intermediate the annular edges thereof, the same have secured thereto a plurality of lugs 17 having openings therein for the reception of the adjustable radial bolts 18 secured to said lugs by means of the nuts 19. The inner end of each bolt 18 is adapted to have secured thereto a coil spring 20, the other end of each spring being connected to a suitable disk 21 mounted upon the hub 5 of the wheel, said bolts being adjustable in order to regulate the tension of said spring. Transversely arranged bolts 22 extend through the oppositely disposed disks 21 and have mounted thereon between the inner faces of said disks and the bosses 6, the collars 23 which assist in retaining the disks in proper positions. The bolts are secured to the disks by means of nuts 24 threaded upon the ends thereof. A housing is provided for the springs and interior portions of the wheel and comprises the oppositely disposed plates 25 which are inturned at their outer edges to provide flanges 26 which receive suitable rivets 27 for securing the housings to the plates 13. The plates 25 of the housing terminates short of the hub 5 of the wheel, as shown, in order to permit of relative movement of the inner and outer rims toward each other. The rubber cushion 10 carried by the inner rim is adapted for engagement with the inner periphery of the outer rim 11 should the latter receive a sufficiently severe shock whereby the concussion will be partially absorbed.

Oppositely disposed brackets 28 are riveted to the plates 13 adjacent their inner edges, said brackets having mounted therebetween a rubber roller 29 which extends transversely between two of the spokes 7 of the inner portion of the wheel. Oftentimes the clutch of an automobile is so operated as to cause the car to suddenly start forward which results in inconvenience to the passengers in the vehicle and in order to overcome this objection the wheel of the present invention is so constructed as to permit of a slight relative movement between the inner and outer rims so that at least a portion of the shock mentioned will be absorbed. This relative movement is limited by means of the roller 29 coming in contact with one of the spokes which will then cause the outer rim, which at first turns slower than the inner rim, to move with the same speed as the inner rim, said roller being made of rubber for the purpose of cushioning the contact therebetween and said spoke.

I claim:—

A vehicle wheel comprising an outer rim member, an inner hub member movable relative thereto and including spokes, oppositely disposed plates carried by said outer rim member and having frictional engagement with said inner hub member, springs connected to said plates and inner hub member, a housing for said springs, oppositely disposed brackets carried by said plates, and a roller carried by the inner ends of said brackets and contacting with one of said spokes for limiting the relative movement between the outer rim member and inner hub member, said frictional engagement permitting a gradual approach of said roller toward said spoke.

EARL H. SIPES.

Signed in presence of—
J. NEVIN SIELE,
B. G. CASE.

Copies of this patent may be obtained for five cents each, by addressing the "Commissioner of Patents, Washington, D. C."